United States Patent
Janssen et al.

(10) Patent No.: US 11,766,048 B2
(45) Date of Patent: Sep. 26, 2023

(54) SYSTEM AND A METHOD FOR PROCESSING A CARCASS LEG PART

(71) Applicant: MAREL MEAT B.V., Boxmeer (NL)

(72) Inventors: Cornelis Joannes Janssen, Boxmeer (NL); Dennis Stoots, Boxmeer (NL); Franciscus Theodorus Henricus Johannes Van Der Steen, Boxmeer (NL)

(73) Assignee: MAREL MEAT B.V., Boxmeer (NL)

( * ) Notice: Subject to any disclaimer, the term of this patent is extended or adjusted under 35 U.S.C. 154(b) by 0 days.

(21) Appl. No.: 18/008,300

(22) PCT Filed: Jun. 8, 2021

(86) PCT No.: PCT/EP2021/065341
§ 371 (c)(1),
(2) Date: Dec. 5, 2022

(87) PCT Pub. No.: WO2021/254837
PCT Pub. Date: Dec. 23, 2021

(65) Prior Publication Data
US 2023/0189827 A1      Jun. 22, 2023

(30) Foreign Application Priority Data
Jun. 15, 2020   (EP) .................................... 20180069

(51) Int. Cl.
*A22C 15/00* (2006.01)
*A22C 17/00* (2006.01)
(52) U.S. Cl.
CPC ........ *A22C 15/003* (2013.01); *A22C 17/0093* (2013.01)
(58) Field of Classification Search
CPC .............. A22C 15/003; A22C 17/0093; A22C 21/0053; A22B 7/005
(Continued)

(56) References Cited

U.S. PATENT DOCUMENTS 3,766,604 A * 10/1973 Lunn .................... A22C 15/003
452/187
2020/0054030 A1* 2/2020 Zomerdijk ......... A22C 17/0093

FOREIGN PATENT DOCUMENTS

EP     1053684 A1    11/2000
EP     2153727 A1     2/2010
(Continued)

OTHER PUBLICATIONS

European Search Report from corresponding European Patent No. EP 20180069.5, dated Nov. 23, 2020.
(Continued)

*Primary Examiner* — Richard T Price, Jr.
(74) *Attorney, Agent, or Firm* — WORKMAN NYDEGGER (57) ABSTRACT

The present disclosure relates to a system and method for processing a carcass leg part comprising a holding section at or near a foot portion. The system comprises a loading station comprising a first conveying device having a supporting surface for supporting and transporting the carcass part towards a loading zone and comprising a positioning device having a first positioning element arranged to be moved along with the carcass part while supported on the supporting surface, configured for positioning the holding section with respect to the supporting surface. The system further comprises a second conveying device comprising a plurality of carriers which are movable through the loading zone. The system is configured such that in the loading zone a carcass part is transferred from the supporting surface to a carrier at the holding section of the carcass part, in an automated manner in use.

16 Claims, 6 Drawing Sheets

(58) Field of Classification Search
USPC .......................................................... 452/179
See application file for complete search history.

(56) References Cited

FOREIGN PATENT DOCUMENTS

| | | |
|---|---|---|
| EP | 3552492 A1 | 10/2019 |
| EP | 3653059 A1 | 5/2020 |
| WO | 2011074966 A1 | 6/2011 |

OTHER PUBLICATIONS

International Search Report from corresponding PCT Application No. PCT/EP2021/065341, dated Sep. 21, 2021.

* cited by examiner

SYSTEM AND A METHOD FOR PROCESSING A CARCASS LEG PART

TECHNICAL FIELD

The present invention relates to a system and method for processing a carcass leg part comprising a holding section at or near a foot portion of the carcass leg part. The invention in particular relates to the processing of pork carcass leg parts, although also carcass leg parts of other four-legged animals such as of cattle or sheep may be processed with the device and method according to the present invention.

BACKGROUND

WO 2011/074966 A1 describes a system comprising a loading station having a conveyor belt defining a supporting surface for supporting thereon and transporting the carcass leg part in a transport direction towards a loading zone. The system also comprises a conveying device comprising carriers, which are movable along a trajectory comprising the loading zone. In the loading zone, the carcass leg part is loaded from the supporting surface of the first conveying device into a carrier of the second conveying device.

Figure 5:
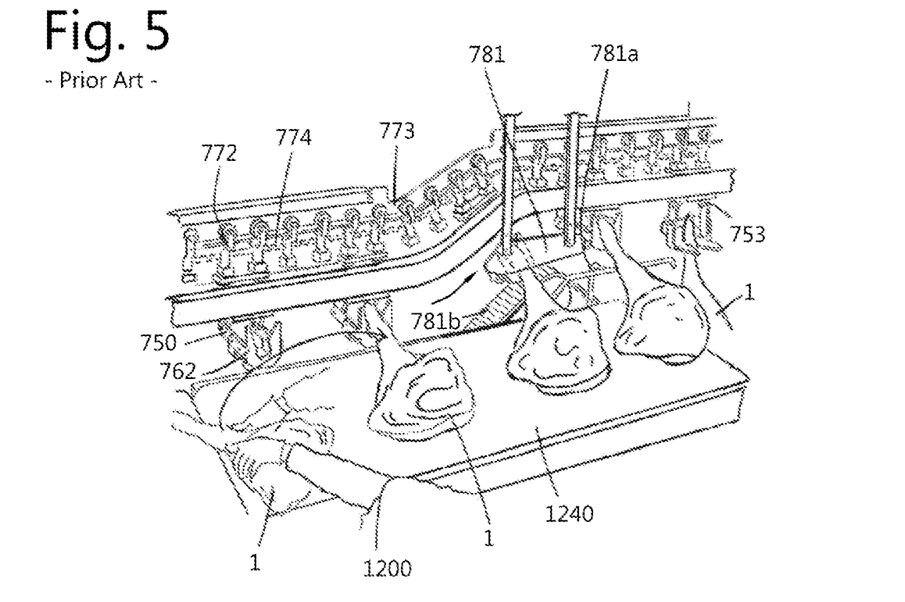
FIG. 5 shows a prior art system.

FIG. 23A of WO 2011/074966 A1 is included in the present disclosure as FIG. 5 and shows a loading zone of a system having a loading station with a supply conveyor belt 1240, and a second conveying device having a plurality of carriers 750, which are moved along a trajectory 773 by trolleys 772 and a drive chain 774. An operator 1200 working at the loading station grabs a leg part 1 and arranges it with the lower part of the foot in the entrance opening of a slot 762 of a carrier as can be understood from FIG. 5. Next, the foot portion is further urged into the slot 762 using the belt 781b on the one hand and the plate 781 on the other hand. Subsequently, the leg part 1 reaches the end of the supply conveyor belt 1240 and falls off the belt 1240. The leg part is then held suspended from the carrier and enters a processing line for further processing steps.

Although said known system works satisfactorily in practice, there is room for improvement regarding ergonomics and efficiency of the system.

SUMMARY

It is an object of the present invention to provide an improved system and method for processing a carcass leg part.

It is a further object of the present invention to provide a system and method for processing a carcass leg part which has improved ergonomics for an operator of the system.

It is a further object of the present invention to provide a system and method for processing a carcass leg part which has an improved efficiency.

In a first aspect, the invention provides a system for processing a carcass leg part comprising a holding section at or near a foot portion of the carcass leg part. The system comprises a loading station comprising a first conveying device having a supporting surface for supporting thereon and transporting the carcass part along a first trajectory in a transport direction towards a loading zone. The loading station also comprises a positioning device having a first positioning element coupled to the first conveying device and arranged to be moved along with the carcass part while supported on the supporting surface, the positioning device being configured for positioning the holding section at a predetermined position, defined by the first positioning element, with respect to the supporting surface during the transport of the carcass part towards the loading zone.

The system further comprises a second conveying device comprising a plurality of carriers which are movable along a second, i.e. other than the first, trajectory passing through the loading zone, each of the plurality of carriers comprising a holding assembly arranged to cooperate with the holding section of the carcass part so as to hold the carcass part in the carrier.

The system is configured such that in the loading zone a carcass part is transferred from the supporting surface to the holding assembly of a carrier at the holding section of the carcass part, in an automated manner in use, so that the holding section of the carcass part is thereby loaded into the carrier and the carcass part is further transported by the second conveying device. As a result, the positioning of the holding section by the positioning device is thus cancelled, i.e. the carcass part is released from the positioning device.

As mentioned above, the present invention relates to a system and to a method for processing a carcass leg part. In an embodiment, the invention relates to a system and to a method for processing a carcass leg part of a four-legged animal, such as for example a pork, cattle or sheep carcass leg part, preferably a pork carcass leg part.

An effect of the system according to the present invention is that due to the provision of the positioning device, which makes possible a correct positioning of the carcass leg parts during transport to the loading zone, an operator working at the system does not have to manually place the carcass leg parts in carriers at the loading zone any longer, which is considered to be a physically demanding act. In this regard, it is noted that pork carcass leg parts may weigh up to 40 kg or even more. Thus, an operator merely needs to place carcass leg parts on the supporting surface at the first positioning elements.

Thereby not only the efficiency but also the ergonomics of the system have been improved. Also, the repeatability of the processing of carcass leg parts on the loading station has improved and thereby the efficiency of the system. Thus, one or more of the objects of the present invention have been achieved.

The carcass parts are intended to be supported on the supporting surface while oriented transverse, i.e. extending in transverse direction. This way an efficient transfer from the supporting surface to the carrier is possible.

The holding section may be a section of the leg part adjacent to the foot of the leg part, at a lower end of the radius or tibia bone.

In an embodiment, the positioning device further comprises a second positioning element, arranged to be moved jointly with the first positioning element and configured for positioning the holding section of the carcass part between the first and second positioning elements during the transport of the carcass part towards the loading zone. This improves the accuracy and reliability of the positioning of a carcass leg part on the supporting surface.

In an embodiment, the positioning device comprises a plurality of spaced apart first positioning elements, each for positioning an individual carcass leg part on the supporting surface and movable towards the loading zone. In the embodiment wherein the positioning device further comprises a second positioning element, it preferably also comprises a plurality of second positioning elements, each of which provided adjacent a first positioning element seen in the transport direction. The positioning device thereby comprises a plurality of combinations, or, pairs, of first and second positioning elements, each for positioning an individual carcass leg part on the supporting surface during the transport to the loading zone. The pairs of first and second positioning elements are spaced apart at a distance seen in the transport direction. Said distance between the individual first positioning elements or between said pairs may be chosen based on the specific carcass leg parts to be processed and may be less than about 1 m. and preferably be in the range of 0.25 to 0.5 m. for pig leg parts.

In an embodiment, the first positioning element is an elongate rod-like element and configured to be able to point upwards with a free end thereof during the transport of the carcass part towards the loading zone, wherein the first positioning element is provided adjacent a longitudinal side of the supporting surface, intended to position the carcass leg part with its foot portion protruding beyond the longitudinal side.

In an embodiment, the first and second positioning elements are each elongate rod-like elements and are each configured to be able to point upwards with a free end thereof during the transport of the carcass part towards the loading zone, wherein the first and second positioning elements are provided adjacent the same longitudinal side of the supporting surface, intended to position the carcass leg part there between with its foot portion protruding beyond the longitudinal side. For that purpose, preferably the first and second positioning elements are each elongate rod-like elements and are each configured to be able to point upwards with a free end thereof to above the supporting surface so that a carcass leg part supported on the supporting surface may be effectively caught and thus positioned between a first and an associated second positioning element, i.e. positioned by a mentioned pair, or, combination, of a first and a second positioning element.

In an embodiment, the second positioning element is movable, preferably pivotable, between an active position in which it points upwards with a free end thereof with respect to the supporting surface and an inactive position in which it has moved away, preferably pivoted downwards, from the first positioning element, preferably to a position lower than the supporting surface, such that in use in the active position of the second positioning element the holding section of the carcass part is caught between the first and second positioning element. In the inactive position of the second positioning element, the carcass part may as a result be placed with its holding section against or at least directly adjacent the first positioning element at a side of the first positioning element facing the second positioning element, at least substantially free from contact with the second positioning element. The distance between the first and its adjacent second positioning element, i.e. the first and second positioning element of one mentioned pair corresponds to, or is smaller than, an entrance width of a holding assembly of the carrier. In another embodiment, the first as well as the second positioning elements are movable between an active and a passive position in the manner described. The movability of the second positioning elements between an active and a passive position may be provided for in a mechanical manner such as using a cam follower principle with a stationary track along the first conveying device on which a follower coupled to or formed by a part of the second positioning element is guided. By providing the second positioning elements in a pivotable manner about a transverse pivot axis, they may be effectively and predictably moved between said active and passive positions while moving towards the loading zone. The first as well as the second positioning elements may to that end be coupled to an endless chain running beside the supporting surface and in synchronicity with the first conveying device, i.e. at a same transport speed as provided for by the supporting surface. The first positioning elements may be rigidly coupled to said chain while the second positioning elements may be pivotably coupled to said chain. Alternatively, the second positioning elements may be moved between the active and passive positions thereof by means of a servo- or stepper motor, a solenoid, a pneumatic cylinder, for example. Alternative to a pivoting movement the second positioning elements may be provided to translate vertically between said positions for example, provided for by any of the means mentioned above.

In an embodiment, the system further comprises an in-line weighing device, also referred to as a flow weighing device, for in-line weighing of the carcass part while being transported towards the loading zone. Preferably, such a weighing device is positioned in between two successive individual sections of the first conveying device, each of the two sections defining an individual section of the supporting surface, wherein the in-line weighing device is arranged such that a carcass part is transported from a section of the first conveying device upstream of the weighing device, via the weighing device where it may thus be weighed in-line, i.e. during the transport, onto a section of the first conveying device downstream of the weighing device in use during the transport thereof towards the loading zone. For this purpose, the weighing device may comprise a weighing conveyor for transporting the carcass part in the transport direction during the weighing. The first positioning element, as well as the second positioning element when provided, are preferably arranged to be moved along with the carcass part while supported on both the individual sections of the supporting surface as well as during the passing of the carcass part over the weighing device.

In an embodiment, the positioning device is configured such that the second positioning element is in its inactive position or at least moved toward the inactive position during the passing of the carcass part over the weighing device. This way, the determination of the weight of the carcass part may be more accurate.

In an embodiment, the system is configured such that a conveying speed of the weighing conveyor is higher than a conveying speed of the section of the first conveying device upstream, preferably also than a conveying speed of the section of the first conveying device downstream, of the weighing device. In an alternative embodiment, the system is configured such that a conveying speed of the weighing device is lower than a conveying speed of the section of the first conveying device upstream of the weighing device, in the embodiment comprising a first positioning element downstream of the carcass leg part. By doing so, the holding section becomes free from the first positioning element as well during the weighing, which further increases the accuracy of the weight determination. The embodiment in which the weighing conveyor has a higher speed is preferred, because it has the additional advantage of at least temporarily separating successive carcass leg parts on the supporting surface in the transport direction to a larger extent, which also contributes to the weighing accuracy.

In all embodiments, the first positioning elements and any second positioning elements may be driven by a common drive system.

In an embodiment, the loading station further comprises a foot guide provided upstream of the loading zone, against which foot guide a free end of a foot portion of the carcass part is to be urged, in an urging direction transverse to the transport direction, in use when the carcass part is supported on the supporting surface. The foot guide may be formed by a vertically oriented guide plate extending in the transport direction, which guide plate is provided stationary at one of and adjacent the supporting surface. In case of an embodiment of the system having the in-line weighing device, the foot guide may only be provided at one side of the individual section of the first conveying device upstream of the weighing device, whereas the downstream section and the weighing device are thus free from such a foot guide. By providing such a foot guide, the positioning of the carcass leg parts on the supporting surface is facilitated and made more reliable at the same time, because the foot guide forms an effective means for the transverse positioning of the carcass leg parts. This also increases the reliability of the positioning by the positioning device and also the later transfer from the supporting surface to the carrier, at the loading zone.

In an embodiment, each of the plurality of carriers of the second conveying device has a base position in which the carrier holds a carcass part during the further transport, and a loading position in which the carrier can engage the carcass part at the holding section thereof at least in the loading zone. In an embodiment the holding assembly of each of the plurality of carriers comprises a slot-like portion for receiving the holding section of the carcass part therein, wherein the slot-like portion has an entrance portion at an open end thereof and a holding portion, wherein the entrance portion is wider than the holding portion. A width of the entrance portion may be about equal or preferably a little wider than a distance in the transport direction between the first and second positioning elements. The system may then comprise a guide for pressing a holding section into the holding assembly, preferably into said holding portion thereof, preferably whilst the carrier is elevated to the loading position, by a ramp conveyor, from the loading zone towards an operating height of the second conveying device.

In an embodiment, each of the plurality of carriers is configured to move, preferably pivot upwards from the base position to the loading position, preferably about a pivot axis extending in the transport direction at least when the carrier is at the loading zone, the slot-like portion being oriented upwards with an open end of the slot-like portion thereof at least in the loading position, wherein the slot-like portion is adjacent the positioning device at least in the loading position thereof, in the loading zone. The movement from the base position to the loading position may be provided for by a guide means positioned stationary along the second trajectory and arranged for urging the carriers from the base to the loading position. Alternatively, a track-follower mechanism may be used, wherein a follower on each carrier runs along a stationary track along the second trajectory. Alternatively, the carriers are arranged to pivot to the loading position by means of a spring mechanism inside each carrier, wherein a guide means or track-follower mechanism may be provided for pivoting the carriers to the base position just upstream of the loading zone and such that the carriers pivot back to the loading position at the loading zone under the influence of said internal spring mechanism.

As an alternative for the holding assembly having the slot-like portion, the carriers may have a holding assembly formed by two mutually movable clamps, or jaws, which are configured to actively clamp, or grip, the holding section of a carcass leg part there between in the loading zone for the purpose of transferring the carcass leg part from the supporting surface to the carrier. For the purpose of moving the holding section of a carcass leg to between the clamps, which may be beside the supporting surface in the loading zone, the system may comprise a pusher, preferably arranged above the supporting surface, configured to push a carcass leg part in transverse direction at the loading zone in an automated manner, i.e. push the carcass leg part sideways on the supporting surface such that the holding section is moved sideways to in between the clamps, which are opened at that time, after which the clamps may close in order to actively clamp the holding section there between and further transport the carcass part away from the loading station along the second trajectory. As a further alternative for the holding assembly having the slot-like portion, the carriers may have a holding assembly in accordance with or similar to the assembly shown in FIGS. 9 and 10 of WO 2011/074966. The assembly may be provided in a tiltable manner like the holding assembly 34 of the carriers 30 as explained below in the description of embodiments. The jaw 211 of the assembly of said FIGS. 9 and 10 may in that case be pivoted upwards such that the front face 215 of the abutment block is arranged to engage the carcass leg part from below, beside the supporting surface, in the loading zone. Then, the hook 212 is urged against the leg part from above, or urged towards the leg part such that it penetrates the meat of the leg part. The carcass leg part may then be further transported away from the loading station along the second trajectory.

In an embodiment the system is configured such that, at least in the loading zone, the transport direction of the first conveying device and a conveying direction of the second conveying device, defined by the second trajectory, are at least substantially parallel to each other and the first and second conveying devices operate at, at least substantially, a same speed, at least in the loading zone.

In an embodiment, the system further comprises a hold down device at the loading zone, positioned above the supporting surface of the first conveying device, and arranged for contacting an upper side of the carcass leg part while it is transported on the first conveying device. The hold down device may be a hold down conveyor, preferably a belt conveyor, wherein a conveyor belt of the belt conveyor extends parallel to the supporting surface. A speed of the hold down conveyor may be set equal to a speed of the first conveying device at least at the loading zone. In use the carcass leg parts pass underneath the hold down conveyor. The provision of the hold down device may reduce the chance of tilting or rolling of the carcass parts, at least in the transport direction, in particular at the loading zone, when the carcass part is transferred from the supporting surface to the holding assembly of a carrier. The hold down device may in another embodiment be a roller hold down conveyor, having a series of rollers extending transverse to the transport direction. In another embodiment the hold down device may have one or more hold down wheels, which may be spring loaded on a frame of the system. The mentioned rollers and the mentioned wheels may be driven at a speed equal to that of the first conveying device, at least at the loading zone. A distance between a lower side of the hold down device and the supporting surface of the first conveying device may be chosen in dependence on the particular carcass leg parts to be handled by the system. For example, said distance may be in the range of 0.1 to 0.2 m.

Corresponding embodiments are also applicable for the below described method according to the second aspect of the present invention. The system is in particular arranged for carrying out the method according to a second aspect of the invention.

In a second aspect, the invention provides a method for processing a carcass leg part comprising a holding section at or in the vicinity of a foot portion of the carcass leg part, using a system according to the first aspect of the present invention, the method comprising the subsequent steps of:

a) placing the carcass part on the supporting surface of the first conveying device, and positioning, using the first positioning element of the positioning device, the holding section of the carcass part at a predetermined position with respect to the supporting surface, b) transporting the carcass part to the loading zone, and c) transferring the carcass part at the holding section thereof from the supporting surface to a carrier at the loading zone, in an automated manner, so that the holding section of the carcass part is thereby loaded into the carrier and the carcass part is further transported by the second conveying device.

In an embodiment step a) comprises urging a free end of the foot portion of the carcass part in the urging direction transverse to the transport direction against the foot guide upstream of the loading zone.

In an embodiment, during step a) the carcass part is placed with its holding section against or at least directly adjacent to the first positioning element, while the second positioning element is in its inactive position, and wherein at the latest during step b) the second positioning element is moved from its inactive to its active position such that the holding section of the carcass part is caught between the first and second positioning element at least in the loading zone.

In an embodiment during step b) the carcass part passes over the weighing device while the second positioning element is in its inactive position or is at least moved toward the inactive position during the passing of the carcass part over the weighing device.

Corresponding embodiments are also applicable for the above-described system according to the first aspect of the present invention. Effects of the method according to the present invention are analogue to the effects of the system according to the invention as described above.

In general terms the present invention relates to a system and method for processing a carcass leg part comprising a holding section at or near a foot portion. The system comprises a loading station comprising a first conveying device having a supporting surface for supporting and transporting the carcass part towards a loading zone and comprising a positioning device having a first positioning element arranged to be moved along with the carcass part while supported on the supporting surface, configured for positioning the holding section with respect to the supporting surface. The system further comprises a second conveying device comprising a plurality of carriers which are movable through the loading zone. The system is configured such that in the loading zone a carcass part is transferred from the supporting surface to a carrier at the holding section of the carcass part, in an automated manner in use.

BRIEF DESCRIPTION OF DRAWINGS

The present invention is described hereinafter with reference to the accompanying schematic drawings in which embodiments of the present invention are shown and in which like reference numbers indicate the same or similar elements.

DESCRIPTION OF EMBODIMENTS

Figure 1:
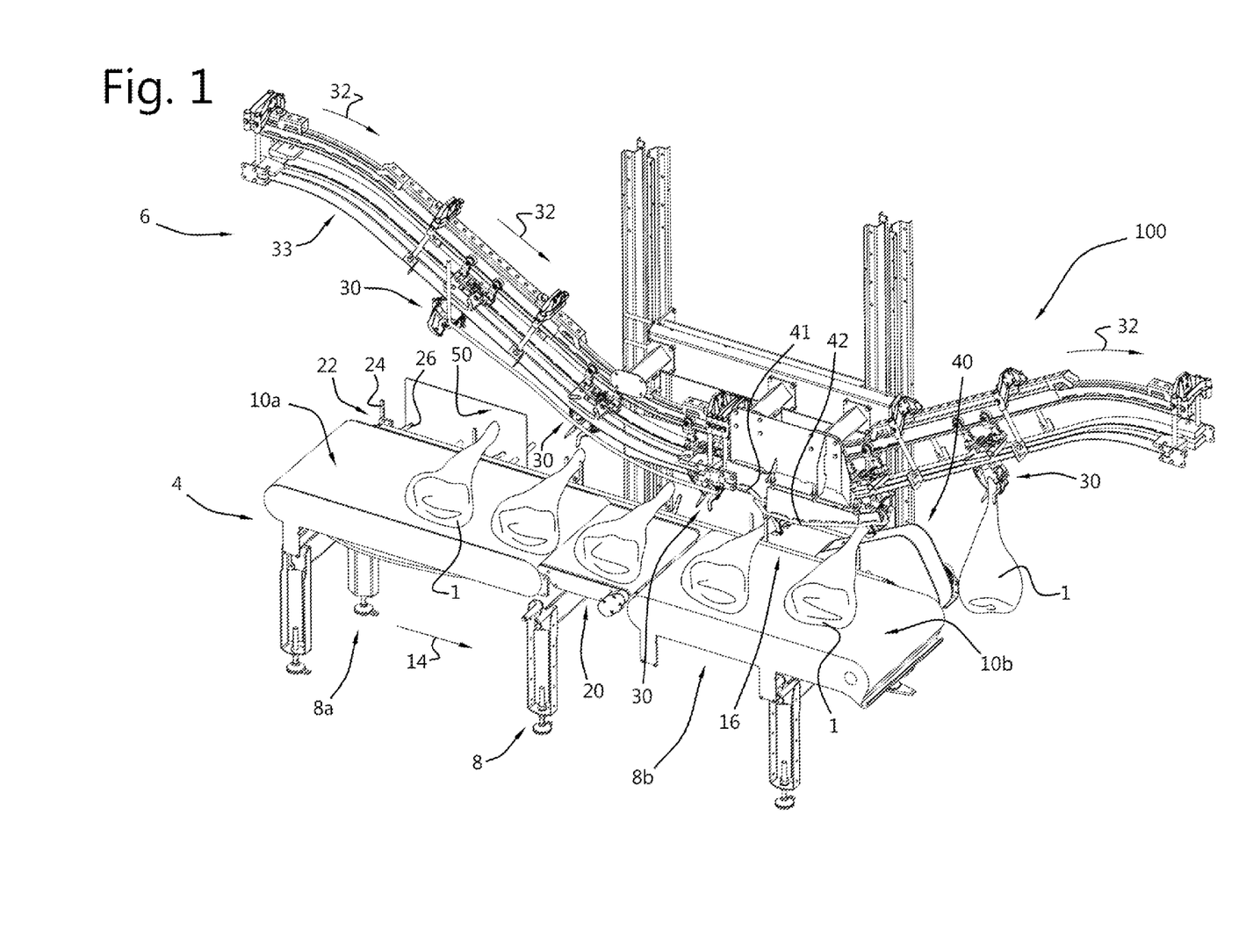
FIG. 1 shows in 3-dimensional view an embodiment of a system for processing a carcass leg part in accordance with the present invention.

FIG. 1 shows a system 100 for processing carcass leg parts 1. System 100 is an example of a system in accordance with the present invention. The carcass leg parts 1 shown highly schematically in the figures represent pork carcass leg parts comprising a foot portion 1*a* and at least a lower leg portion 1*b*. The leg parts may also comprise an upper leg portion including the femur (hind leg) or humerus bone (front leg). For the purpose of explaining the principle of the present invention, a holding section 2 is defined as being a section of the carcass leg part 1 at the foot portion 1*a* or near the foot portion 1*a* of the carcass leg part 1, such as a section of the leg part adjacent to the foot of the leg part, at a lower end of the radius or tibia bone. See in particular FIG. 4. The purpose of the system 100, and in particular of a loading station 4 thereof, is to supply the leg parts 1 to a loading zone 16 where the carcass leg parts are to be transferred to carriers 30 of a second conveying device 6. Conveyors of the kind referred to in the present description as 'second conveying device' are known and commonly used in the field of carcass parts processing. Carriers may be configured for transporting a carcass part suspended from the carrier, wherein the carcass part may be actively or passively clamped, gripped, penetrated by some hook-like element, or engaged in another manner. An example of such a conveyor, more specifically an overhead conveyor, is described in WO 2011/074966 A1. Such a conveyor, in the example shown in the figures being an overhead conveyor having carriers that passively clamp the carcass parts, will be referred to as the second conveying device in the below further explanation of examples of systems according to the invention. The invention however also covers other kinds of such conveyors such as having an above-mentioned kind of carriers.

The system 100 comprises a loading station 4 and a second conveying device 6, which is, at least in the example shown in the figures, an overhead conveyor as mentioned above. The loading station 4 comprises a first conveying device 8 having a supporting surface 10 for supporting thereon and transporting the carcass leg parts 1 along a first trajectory 12 in a transport direction 14 towards a loading zone 16. The first conveying device 8 has a flat belt conveyor, which forms the supporting surface 10 at an upper part of the first trajectory 12. The first conveying device may alternatively or in combination with a flat belt conveyor have a modular belt made of modular units such as of a length in the transport direction of 10 to 50 mm, internally connected via a hinge system, for example, or may be a roller conveyor. A modular belt is less susceptible to tension in the belt but needs more cleaning. Depending on the actual situation, a choice may be made for a specific type of conveyor.

As shown in the figures, the leg parts 1 are oriented in transverse direction, i.e. with a longitudinal axis of the leg part transverse to the transport direction 14. That means, the foot portion 1*a* generally points sideways, and the foot portions of all leg parts face the same direction. At least in the example shown, the first conveying device 8 has two successive individual sections 8a, 8b, each of the two sections 8a, 8b defining an individual section 10a, 10b of the supporting surface 10. An in-line weighing device 20 is provided in between said sections 8a, 8b, and such that a carcass part 1 is transported from the section 8a of the first conveying device 8 upstream of the weighing device 20, via the weighing device 20, onto the section 8b of the first conveying device 8 downstream of the weighing device 20 in use during the transport thereof towards the loading zone 16. The use of an in-line weighing device 20 is optional in view of the present invention. Depending on the actual case in practice, an in-line weighing device may be provided when the carcass parts need to be weighed while transported on the loading station 4. If not, for example if the leg parts have already been weighed earlier on in the process, a weighing device may be omitted. In that case the first conveying device 8 may comprise only one section, such as formed by a flat belt conveyor having one continuous supporting surface 10. The provision of an in-line weighing device integrated in the loading station is however convenient because in that case a weight of each carcass part may be easily coupled—in an automated manner by a control module of the system—to the specific carcass part which is to be transferred to a carrier of the second conveying device later on. The position of the leg part in the second conveying device, i.e. in the specific carrier 30, is known for a specific leg part. The weight of the leg part can thus be associated with a specific carrier for further processing.

The loading station 4 also comprises a positioning device 22 having a plurality of first positioning elements 24 provided at a distance from each other along the first conveying device 8, coupled to the first conveying device 8, and arranged to be moved along with the carcass part 1 while the carcass part is supported on the supporting surface 10. Thus, the first positioning elements 24 of the positioning device 22 are configured to move along with the supporting surface 10. Each of the first positioning elements 24 are configured for positioning the holding section 2 of one carcass leg part 1 at a predetermined position, defined by the first positioning element 24, with respect to the supporting surface 10 during the transport of the carcass part 1 towards the loading zone 16. The positioning device 22 may also have a plurality of second positioning elements 26, each associated with each first positioning element 24 and provided spaced apart adjacent the positioning element 24 in the transport direction. The second positioning elements 26 are arranged to be moved jointly with the first positioning elements 24 and are configured for positioning the holding section 2 of the carcass part 1 between the first and second positioning elements 24, 26 during the transport of the carcass part 1 towards the loading zone 16. The provision of said second positioning elements 26 is thus optional but they contribute to positioning the carcass leg parts 1 on the supporting surface 10 more reliably and more accurately. To that end, a distance d (see FIG. 3) between each mutually associated first and second positioning element 24, 26 is preferably a little greater than a width of the holding section 2 of an expected largest carcass leg part 1 to be transported by the system. For pork carcass leg parts said width generally amounts to about 3 to 7 cm, on average between 4 and 6 cm, typically about 5 cm. So, the positioning device of the system 100 comprises a plurality of combinations of a first and a second positioning element, each for positioning one carcass leg part on the supporting surface, of which the first and second positioning element may at a distance of about 5 cm, or a little greater, such as between 5 and 5.5 cm.

Figure 3:
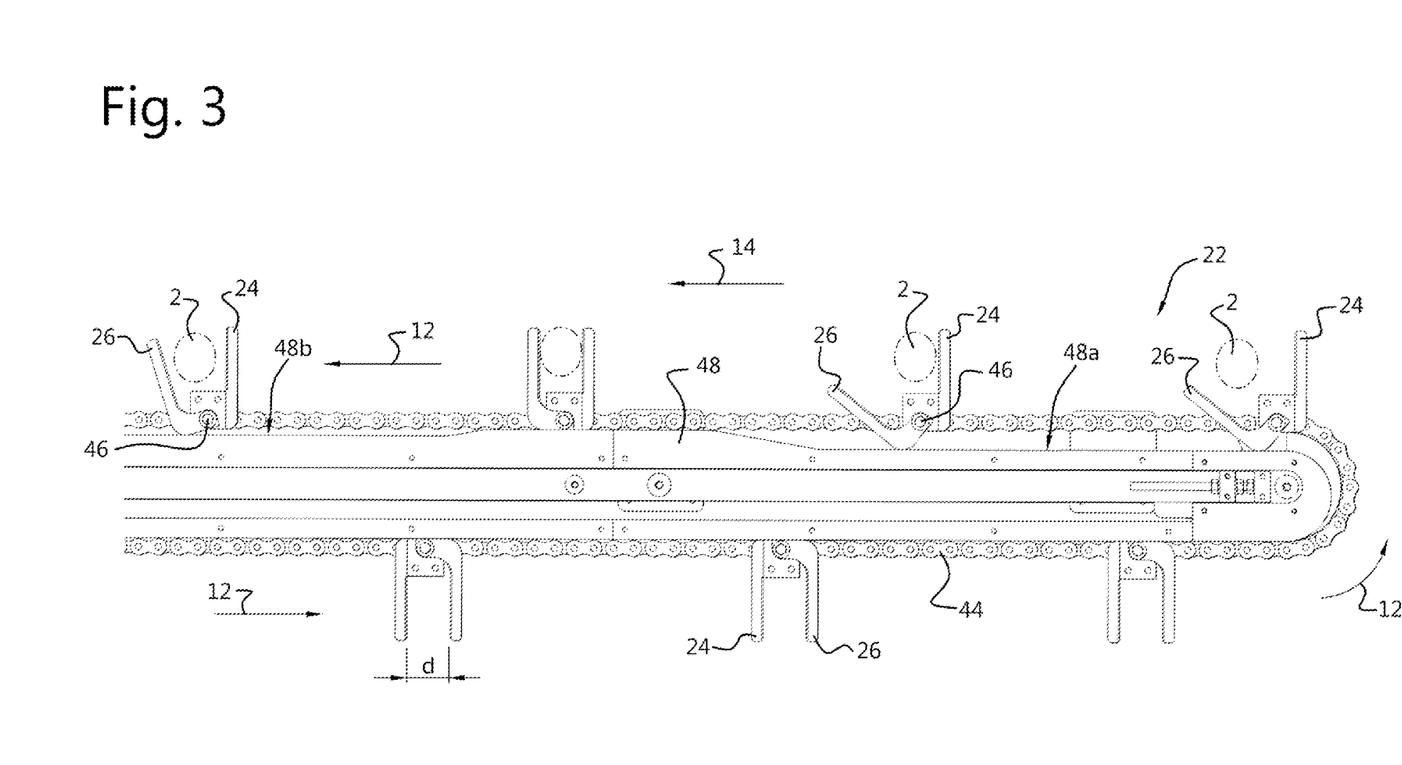
FIG. 3 shows in rear view a part of a loading station of the system of FIG. 1.
Figure 4:
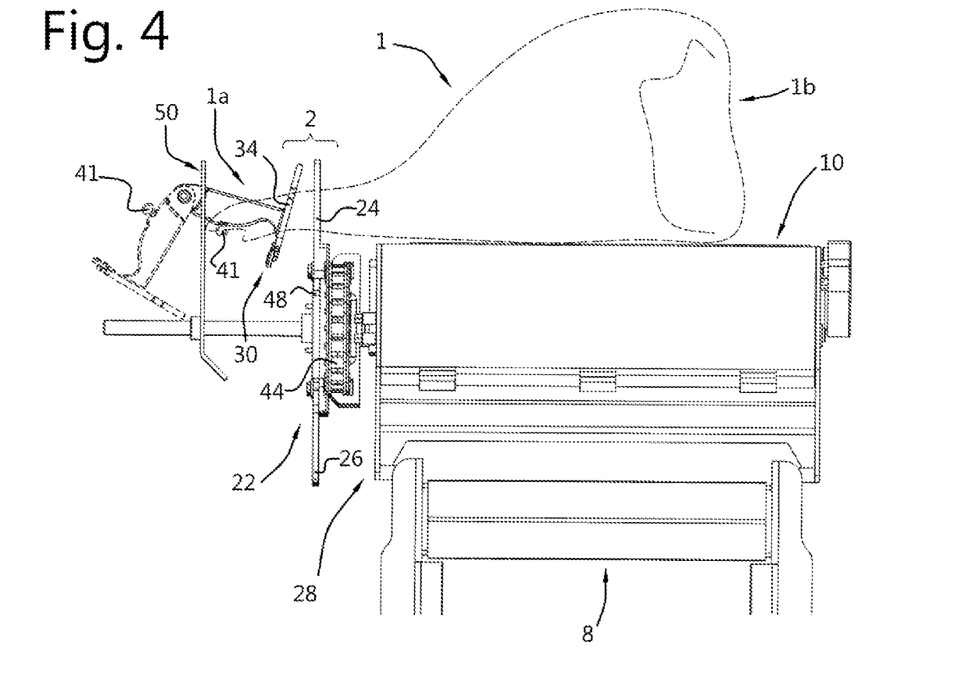
FIG. 4 shows in side view a part of the system of FIG. 1.

As shown in the figures, the first and second positioning elements 24, 26 are each elongate rod-like elements and are each configured to be able to point upwards with a free end thereof, i.e. extending in a vertical direction perpendicular to the supporting surface 10 and higher than the supporting surface as in particular FIG. 4 shows, during the transport of the carcass parts 1 towards the loading zone 16. The first and second positioning elements 24, 26 are provided adjacent one longitudinal side 28 of the supporting surface 10, intended to position the carcass leg part 1 with its foot portion 1a protruding beyond the longitudinal side 28 as shown in particular in FIG. 4. Further details of the positioning device 22 and of how it is moved along with the supporting surface 10 and thus with the carcass parts 1 will be discussed below with reference to in particular FIG. 3. In use of the system 100, a carcass part 1 has to be placed at one side directly adjacent to or abutting against a first positioning element 24. This may be carried out by an operator while placing the carcass part 1 from a supply onto the supporting surface 10, in the example according to the figures onto the most upstream section 10a thereof. In case the system also comprises said second positioning elements 26, the operator needs to place the leg parts 1 directly adjacent to or abutting against a first positioning element 24 at the side of the second positioning element 26 associated with that first positioning element 24 so that the holding section 2 is placed between the first positioning element 24 and the second positioning element 26.

Figure 2:
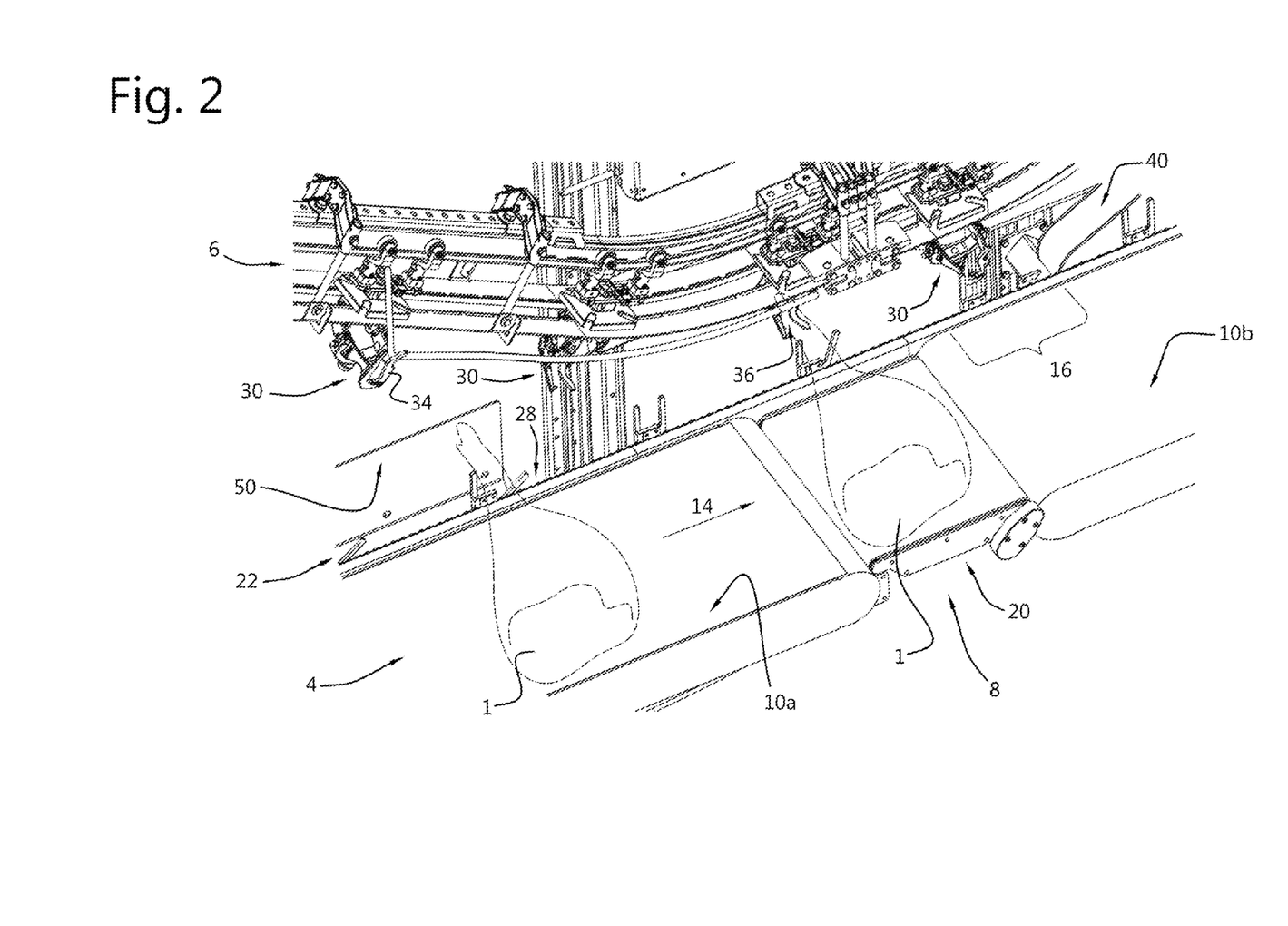
FIG. 2 shows a part of the system of FIG. 1 from a different viewpoint.

The second conveying device 6 as already mentioned comprises a plurality of spaced apart successive carriers 30 which are movable, by a drive system not further shown in the figures, along another, second trajectory 32, defined by an overhead rail system 33, passing through the loading zone 16. Only a few of the carriers 30 are shown in the figures for the purpose of explaining the present invention. Each of the plurality of carriers 30 comprises a holding assembly 34 arranged to cooperate with the holding section 2 of a carcass part 1 so as to hold the carcass part 1 in the carrier 30 by means of passively clamping the holding section of the carcass part 1. Each of the plurality of carriers 30 has a base position in which the carrier may hold a carcass part 1 during the further transport (see the rightmost carcass part in FIG. 1). Each of the carriers, or at least the holding assembly 34 thereof, may be pivoted upwards between this base position and a loading position in which the holding assembly 34 can engage the carcass part 1 at the holding section 2 thereof at least in the loading zone 16. In the view of FIG. 2, the leftmost carrier and the rightmost carrier are in the loading position (the leftmost carrier in FIG. 2, as well as in FIG. 1, merely to clearly show the loading position in the figures for the purpose of explaining the present invention), while the two carriers 30 between said left- and rightmost carrier have been pivoted, clockwise seen in the transport direction 14, or, downward, to the base position thereof.

The mentioned pivoting movement from the base position to the loading position is realized by the guide bar 41 positioned stationary along the second trajectory 32 at the loading zone and immediately upstream the loading zone. The guide bar 41 is positioned such that it comes in contact with a back side of the carriers and designed to let the carrier pivot upwards while passing along the guide bar 41, such that it moves from the base position to the loading position. Instead of a guide bar, a track-follower mechanism may be provided, where a follower on each carrier runs on a track positioned stationary along the second trajectory. Alternatively, the carriers may be designed such that they tend to tilt upwards towards the loading position such as under the influence of a spring force operative within each carrier. The carriers may be held in the base position by a similar guide bar or other guide means positioned along the second trajectory upstream of the loading zone wherein at the loading zone said guide means end and the carriers pivot upwards to the loading position as a result of said spring force.

The holding assembly 34 of each of the plurality of carriers 30 comprises a slot-like portion 36 for receiving the holding section 2 of the carcass part 1 therein. The slot-like portion 36 has an entrance portion at an open end thereof and a holding portion deeper in the slot-like portion, wherein the entrance portion is wider than the holding portion. The holding portion is designed such that a carcass part urged into the holding portion is passively clamped in the holding portion, which holding portion for that purpose is of a width slightly smaller than a width of the—average— holding section 2 of the carcass part 1. A width of the entrance portion is about equal or preferably a little wider than the above-mentioned distance d in the transport direction between the first and second positioning elements 24, 26 so that a carcass part can be reliably transferred to the carrier. A carrier having a holding assembly with such a holding portion is in particular suitable for use with pig carcass leg parts, for clamping the foot portion of the carcass leg part. In the loading position the holding assembly 34 is oriented upwards with an open end of the slot-like portion 36 thereof, wherein the slot-like portion is adjacent the positioning device 22, that means adjacent a combination of a first and second positioning element 24, 26 thereof seen in transverse direction (see FIG. 4) and at least in the loading position thereof and in the loading zone 16. In FIG. 2 this is shown for the right-most carrier 30 which is just moving, along the trajectory 32 thereof, through the loading zone 16.

In accordance with the present invention, the system 100 is configured such that in the loading zone 16 a carcass part 1 is transferred from the supporting surface 10 to the holding assembly 34 of a carrier 30 at the holding section 2 of the carcass part 1, in an automated manner in use, so that the holding section 2 of the carcass part 1 is thereby loaded into the carrier 30 and the carcass part 1 is further transported by the second conveying device 6. The positioning of the holding section 2 by the positioning device 22 is then consequently cancelled, i.e. the carcass part is released from the positioning device 22 after the transfer of the carcass part to the carrier. In the view of FIG. 1, the right-most carcass part 1 has already been transferred from the supporting surface 10 to a carrier 30 and is already moving away from the loading zone along the second trajectory 32 of the second conveying device 6, while its upstream neighboring carcass part is just in the process of being transferred by the upwards pivoting of the holding assembly 34 of a carrier 30 which is adjacent in transverse direction and in line with a first and second positioning element 24, 26, in the transport direction 14, positioning that carcass part 1 on the supporting surface 10. At least in the loading zone 16, the transport direction 14 of the first conveying device 8 and a conveying direction of the second conveying device 6, defined by the trajectory 32 thereof in the loading zone 16, are at least substantially parallel to each other and the first and second conveying devices 8, 6 operate at, at least substantially, a same speed. This way, carcass leg parts 1 may be reliably transferred from the supporting surface 10 to the carriers 30.

For the purpose of reliably clamping a holding section 2 of a carcass part 1 in the holding assembly 34 of a carrier 30, a pusher bar 42 is provided downstream of the loading zone 16, for exerting a downward force onto the holding section 2 while moving with the carrier 30 along the second trajectory and off the supporting surface 10. The pusher bar 42 thus urges the holding section 2 deeper into the holding portion of the slot-like portion 36 of the holding assembly 34 of the carrier 30 so that it will be reliably clamped inside the holding assembly 34. In order to support the carriers during said urging by the pusher bar 42, a further conveyor belt 40 provided as a ramp is provided adjacent the final part of the supporting surface 10, downstream of the loading zone. The pusher bar 42 is omitted from FIG. 2 for clarity.

Figure 6:
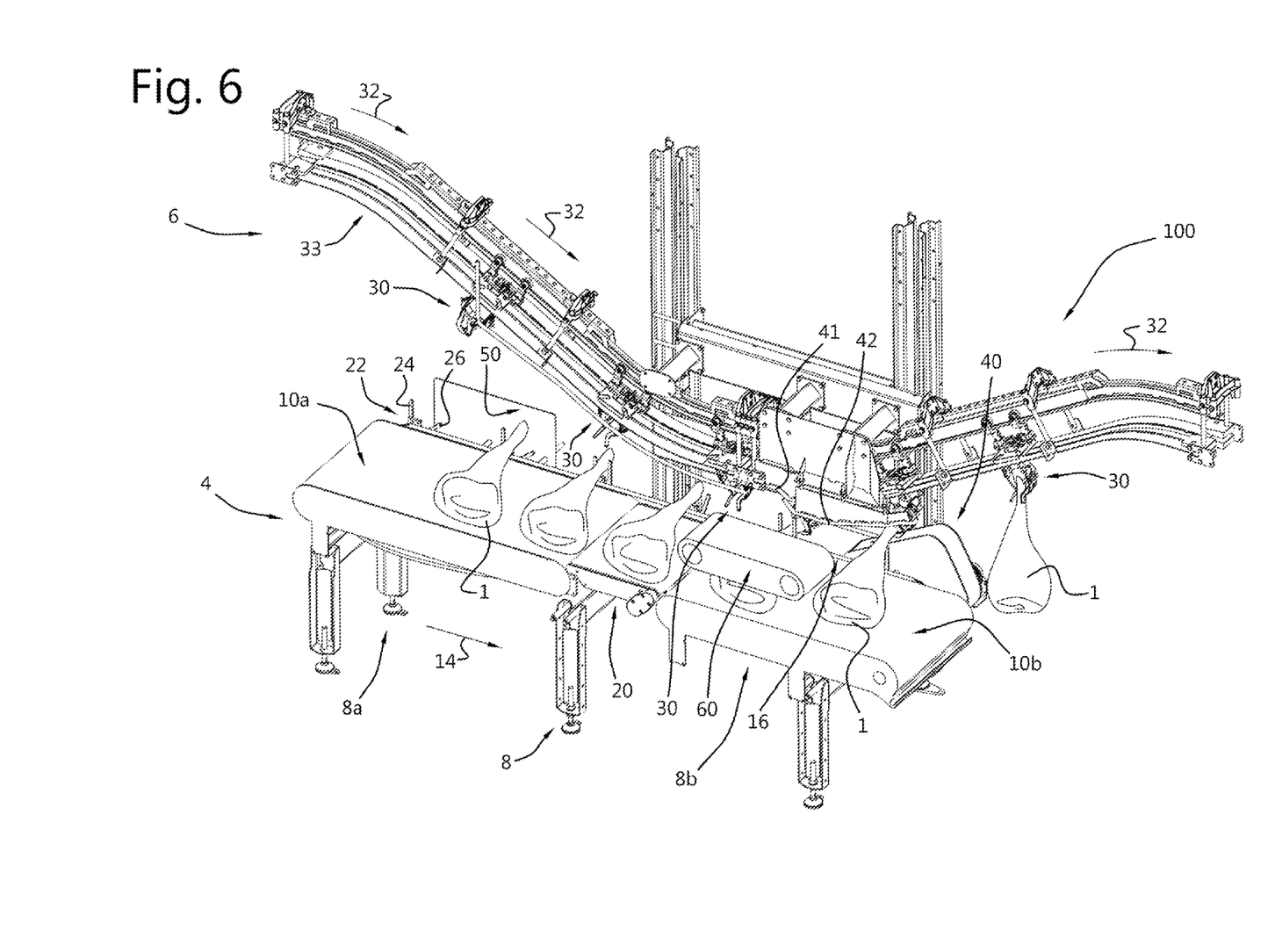
FIG. 6 shows in 3-dimensional view a further embodiment of a system for processing a carcass leg part in accordance with the present invention.
Figure 7:
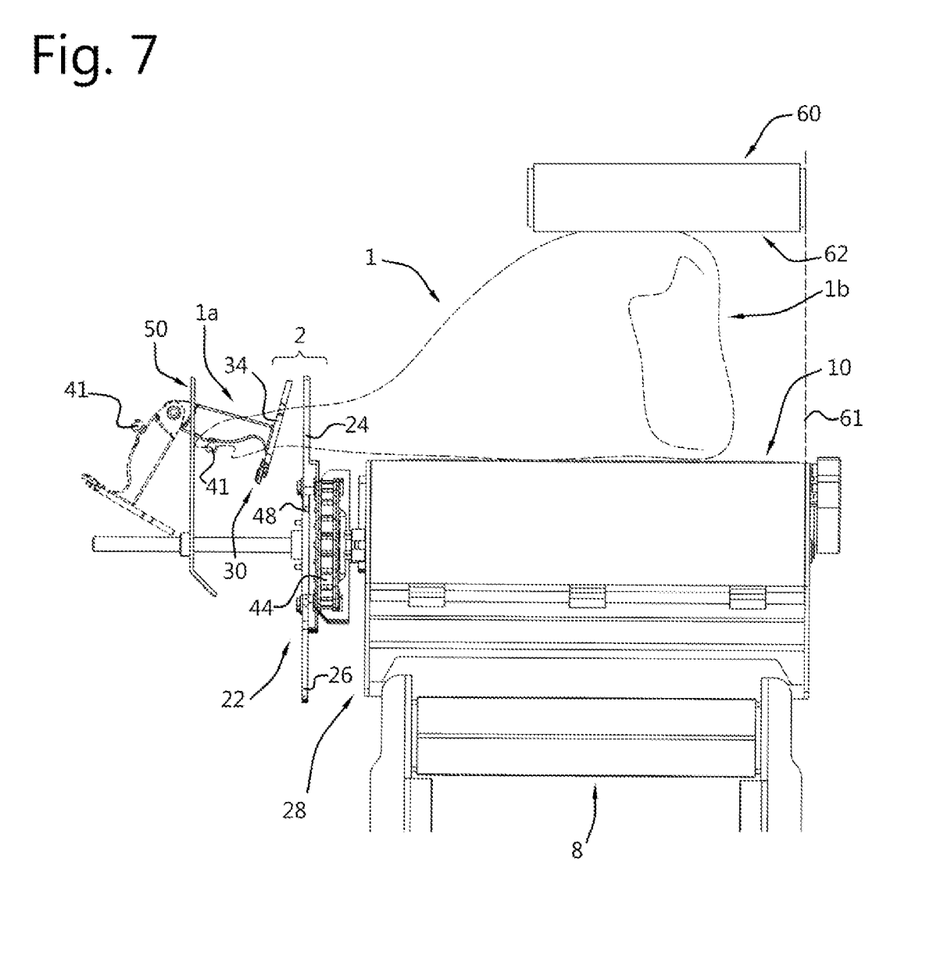
FIG. 7 shows in side view a part of the system of FIG. 6.

FIGS. 6 and 7 show, very schematically, an optional hold down conveyor 60, positioned above the downstream section 8b of the first conveying device 8. The hold down conveyor may be driven at the same speed as section 8b. The hold down conveyor 60 extends over the loading zone 16 and a lower belt conveyor surface 62 is parallel to the section 10b of the supporting surface. It connects to a frame of the system via brackets 61 or the like (not drawn in FIG. 6). A downstream end of the hold down conveyor 60, on the right side in the view of FIG. 6, is located just upstream of conveyor belt 40. The purpose of the hold down conveyor 60 is to contact an upper side of the lower leg portion 1b with a lower conveyor belt surface 62 while the carcass part 1 moves underneath the hold down conveyor 60, as FIG. 7 shows. The presence of the hold down conveyor 60 above the section 8b and the driving thereof at the same speed as the section 8b reduces the chance of tilting or rolling of the carcass part 1, at least in the transport direction 14, in particular in the loading zone, when the carcass part 1 is transferred from the supporting surface 10 to the holding assembly 34 of a carrier 30 at the holding section 2 of the carcass part 1, so that the holding section 2 of the carcass part 1 is thereby loaded into the carrier 30.

Although the figures show a second conveying device provided with carriers having holding assemblies with slot-like portions which pivot upwards just beside a first and second positioning element for the purpose of transferring the carcass part to the carrier, the present invention also covers other kinds of known second conveying devices, such as for example conveying devices having carriers which have a holding assembly formed by at two mutually movable clamps, or jaws, which are configured to actively clamp, or grip, the holding section of a carcass leg part there between in the loading zone for the purpose of transferring the carcass leg part from the supporting surface to the carrier. For the purpose of moving the holding section of a carcass leg to between the clamps, which may be beside the supporting surface in the loading zone, the system may comprise a pusher configured to push a carcass leg part in transverse direction at the loading zone, i.e. push the carcass leg part sideways on the supporting surface such that the holding section is moved sideways to in between the clamps, which are opened at that time, after which the clamps may close in order to actively clamp the holding section there between and further transport the carcass part away from the loading station along the second trajectory.

As mentioned the positioning device 22 has a plurality of pairs of a first and a second positioning element 24, 26, moving along with the supporting surface 10 and thus with the carcass parts 1 towards the loading zone 16. Optionally, and as is the case in the example shown in the figures, the second positioning element 26 is movable, in the present example pivotable, between an active position in which it points upwards with a free end thereof with respect to the supporting surface 10 and an inactive position in which it has moved away, preferably pivoted downwards, from the first positioning element 24, such that in use in the active position of the second positioning element 26 the holding section 2 of the carcass part is caught between the first and second positioning element 24, 26, whereas in the inactive position the holding section is free from being caught between said elements 24, 26. In the inactive position of the second positioning element 26, the carcass part 1 may be placed with its holding section 2 against or at least directly adjacent the first positioning element 24 at the side of the first positioning element 24 facing the second positioning element 26, at least substantially free from contact with the second positioning element 26, as is shown for the leftmost carcass part in FIGS. 1 and 2. For each combination, the second positioning element 26 may be provided downstream of the first positioning element 24 as shown, although the other way around is also possible within the scope of the present invention. The distance d between said elements 24, 26 at least in the active position of second positioning element 26, is equal to, or preferably slightly smaller than, the width of the above-mentioned entrance portion of the slot-like portion 36 of the holding assembly 34 of the carriers 30, so as to make sure that the carcass parts may be reliably transferred to the carriers 30.

FIG. 3 shows the positioning device 22. The pairs of each first positioning element 24 and second positioning element 26 are mounted on a drive chain 44 following the first trajectory 12, of which an upper part moves in the transport direction 14. It is noted in this regard that for the purpose of the present invention, only the upper part 12 of the first trajectory 12 is relevant; the bottom part is just a return part for the—endless—chain and positioning elements. As shown each first positioning element 24 is fixated onto the chain 44, that is, it cannot pivot or move relative to the chain 44 at its fixation point to the chain. Each second positioning element 26 is pivotable as mentioned, wherein they can each pivot about a transversely extending pivot axis 46 thereof with respect to the chain 44 and thus with respect to the first positioning element 24.

Each second positioning element 26 is supported by a stationary track 48, the element 26 running like a cam follower on the track 48. When the stationary track lowers down with respect to the chain, the second positioning elements pivots counterclockwise (in the view of FIG. 3), and vice versa. This way, the second positioning elements may very efficiently and reliably be pivoted between the inactive and active position thereof while moving in the transport direction 14 along the first trajectory 12. As FIG. 3 shows, the track 48 has a first lowered portion 48a. This is the most upstream part of the first conveying device 8, beside an upstream part of the upstream section 10a of the supporting surface 10. As mentioned above here the second positioning element 26 is in the inactive position thereof, as FIG. 3 also shows for the two right-most elements 26, so that an operator may easily place a carcass part 1 on the upstream end of the supporting surface 10 with the holding section (represented by dashed lines in FIG. 3) beside the first positioning element 24. While the carcass parts 1 move together with the positioning elements 24, 26 in the transport direction 14, the track 48 rises relative to the chain 44 as FIG. 3 shows so that the second positioning elements 26 are forced to pivot clockwise (in the view of FIG. 3) to the active positioning, catching a holding section 2 between elements 24 and 26 as shown.

Also shown in FIG. 3 is a further lowered track section 48b. This section is beside the in-line weighing device 20. The positioning device 22, more specifically the pairs of first and second positioning elements 24, 26 thereof, are arranged to be moved along with the carcass part 1 while supported on both the individual sections 10a, 10b of the supporting surface 10 as well as during the passing of the carcass part 1 over the weighing device 20. For the purpose of accurately weighing the carcass part 1, it is preferred that the holding section 2 is at least to a large extent free from contact with the positioning device 22. For this purpose, the second positioning elements 26 are then in or at least moved toward the inactive position as FIGS. 1, 2 and 3 show, i.e. during the passing of the carcass part 1 over the weighing device 20, as a consequence of the lowered track section 48b beside the weighing device 20.

A conveyor belt which is part of the weighing device may run at the same or at about the same speed compared to at least the upstream section 8a and preferably both the upstream and downstream sections 8a, 8b of the first conveying device 8, forming supporting surface sections 10a and 10b respectively. However, another measure for increasing the accuracy of the weight measurement and making sure that the holding section is also free from the first positioning element 24, as the left-most holding section 2 in FIG. 3, is to let a conveyor belt which is part of the weighing device run faster, preferably slightly faster, compared to at least the upstream section 8a and preferably both the upstream and downstream sections 8a, 8b of the first conveying device 8, forming supporting surface sections 10a and 10b respectively. Said conveyor belt which is part of the weighing device running faster may mean that it runs faster such that the holding section becomes free from positioning element 24 over a distance in the range of 1 mm to 10 mm, for example, preferably in the range of 1 to 5 mm. It is noted in this regard that in case that the second positioning elements would each time be positioned upstream of the associated first positioning element then such a conveyor belt of the weighing device would be operated to run slightly slower, to achieve the same effect of the holding section becoming loose from the first positioning element.

The loading station 4 further comprises a foot guide 50 provided upstream of the loading zone 16 and in the present example also upstream of the weighing device 20, at a most upstream individual section 10a of the supporting surface 10 of the first conveying device 8. So, the section 10b is free from such a foot guide. The foot guide 50 is formed by a vertically oriented guide plate extending in the transport direction 14, which guide plate 50 is provided stationary at one side 28 of and adjacent the supporting surface 10, more precisely at the same longitudinal side as the positioning device 22. In use, when a carcass part 1 is placed on the loading station 4, such as by an operator, and thus supported on the supporting surface 10, a free end of the foot portion 1a of the carcass part 1 is to be urged against this foot guide 50, in an urging direction transverse to the transport direction 14. This is shown in FIG. 4. This way it is achieved that the carcass part 1 is also positioned in transverse direction on the supporting surface 10 in a well-defined manner. As a result, the carcass part 1 will be well-positioned at the holding section 2 thereof by the positioning device 22.

As already explained above at least for individual steps thereof, an example of a method in accordance with the invention, for processing a carcass leg part 1 comprising a holding section at or in the vicinity of a foot portion of the carcass leg part, using a system 100, comprises the following subsequent steps. First, a carcass part 1 is placed on the supporting surface 10 of the first conveying device 8, in the present example on the most upstream part of the individual section 10a. Preferably while placing or otherwise immediately after the placing of the part 1 on the supporting surface 10, the holding section is positioned, using the first positioning element 24 of the positioning device 22, at a predetermined position with respect to the supporting surface 10, i.e. in the transport direction. This may be done by the operator. Although the foot guide 50 is optional, preferably at that time also a free end of the foot portion 1*a* of the carcass part 1 is urged in an urging direction transverse to the transport direction 14 against the foot guide 50. The carcass part is to be placed with its holding section 2 against or at least directly adjacent to the first positioning element 24, while the second positioning element 26 is in its inactive position, and wherein afterwards, but before the carcass part 1 arrives at the loading zone 16, the second positioning element 26 is moved from its inactive to its active position such that the holding section 2 of the carcass part 1 becomes caught between the first and second positioning element 24, 26 and is thus caught between same at least in the loading zone 16.

The carcass part is then (further) transported to the loading zone 16, and the carcass part 1 is transferred at the holding section 2 thereof from the supporting surface 10 to a carrier 30 at the loading zone 16, in an automated manner, so that the holding section 2 of the carcass part 1 is thereby loaded into the carrier 30 and the carcass part 1 is further transported by the second conveying device 6, as described in detail above. During the transporting of the carcass part towards the loading zone 16, the carcass part may pass over the weighing device 20 (i.e. in case that a weighing device has been provided) while the second positioning element 26 is in its inactive position or is at least moved toward the inactive position during the passing of the carcass part over the weighing device 20.

Other variations to the disclosed embodiments can be understood and effected by those skilled in the art in practicing the claimed invention, from a study of the drawings, the disclosure, and the appended claims. The foregoing description provides embodiments of the invention by way of example only. The scope of the present invention is defined by the appended claims. One or more of the objects of the invention are achieved by the appended claims.

The invention claimed is:

1. A system for processing a carcass leg part comprising a holding section at or near a foot portion of the carcass leg part, the system comprising:
   a loading station comprising:
   a first conveying device having a supporting surface for supporting thereon and transporting the carcass part along a first trajectory in a transport direction towards a loading zone, and
   a positioning device having a first positioning element coupled to the first conveying device and arranged to be moved along with the carcass part while the carcass part is supported on the supporting surface, the positioning device being configured for positioning the holding section at a predetermined position, defined by the first positioning element, with respect to the supporting surface during the transport of the carcass part towards the loading zone, the system further comprising:
   a second conveying device comprising a plurality of carriers which are movable along a second trajectory passing through the loading zone, each of the plurality of carriers comprising a holding assembly arranged to cooperate with the holding section of the carcass part so as to hold the carcass part in the carrier,
   wherein the system is configured such that in the loading zone a carcass part is transferred from the supporting surface to the holding assembly of a carrier at the holding section of the carcass part, in an automated manner in use, so that the holding section of the carcass part is thereby loaded into the carrier and the carcass part is further transported by the second conveying device.

2. The system according to claim 1, wherein the first positioning element is an elongate rod-like element and configured to be able to point upwards with a free end thereof during the transport of the carcass part towards the loading zone,
   wherein the first positioning element is provided adjacent a longitudinal side of the supporting surface, intended to position the carcass leg part with its foot portion protruding beyond the longitudinal side.

3. The system according to claim 1, wherein the positioning device further comprises a second positioning element, arranged to be moved jointly with the first positioning element and configured for positioning the holding section of the carcass part between the first and second positioning elements during the transport of the carcass part towards the loading zone.

4. The system according to claim 3, wherein the second positioning element is an elongate rod-like element and configured to be able to point upwards with a free end thereof during the transport of the carcass part towards the loading zone,
   wherein the first and second positioning elements are both provided adjacent the same longitudinal side of the supporting surface, intended to position the carcass leg part there between with its foot portion protruding beyond the longitudinal side.

5. The system according to claim 3, wherein the second positioning element is movable, between an active position in which it points upwards with a free end thereof with respect to the supporting surface and an inactive position in which the second positioning element has moved away, from the first positioning element, such that in use in the active position of the second positioning element the holding section of the carcass part is caught between the first and second positioning element.

6. The system according to claim 1, further comprising an in-line weighing device positioned in between two successive individual sections of the first conveying device, each of the two sections defining an individual section of the supporting surface,
   wherein the in-line weighing device is arranged such that a carcass part is transported from a section of the first conveying device upstream of the weighing device, via the weighing device, onto a section of the first conveying device downstream of the weighing device in use during the transport thereof towards the loading zone,
   wherein the first positioning element is arranged to be moved along with the carcass part while supported on both the individual sections of the supporting surface as well as during the passing of the carcass part over the weighing device.

7. The system according to claim 6, wherein the positioning device is configured such that the second positioning element is in the inactive position or at least moved toward the inactive position during the passing of the carcass part over the weighing device,
   wherein the system is configured such that a conveying speed of the weighing device is higher than a conveying speed of the section of the first conveying device upstream of the weighing device.

8. The system according to claim 1, wherein the loading station further comprises a foot guide provided upstream of the loading zone, against which foot guide a free end of a foot portion of the carcass part is to be urged, in an urging direction transverse to the transport direction, in use when the carcass part is supported on the supporting surface.

9. The system according to claim 8, wherein the foot guide is formed by a vertically oriented guide plate extending in the transport direction which guide plate is provided stationary at one side of and adjacent the supporting surface.

10. The system according to claim 6, wherein the loading station further comprises a foot guide provided upstream of the loading zone, against which foot guide a free end of a foot portion of the carcass part is to be urged, in an urging direction transverse to the transport direction, in use when the carcass part is supported on the supporting surface;
    wherein the foot guide is provided at one side of the individual section of the first conveying device upstream of the weighing device.

11. The system according to claim 1, wherein each of the plurality of carriers has a base position in which the carrier holds a carcass part during the further transport, and a loading position in which the carrier can engage the carcass part at the holding section thereof at least in the loading zone,
    wherein the holding assembly of each of the plurality of carriers comprises a slot-like portion for receiving the holding section of the carcass part therein,
    wherein the slot-like portion has an entrance portion at an open end thereof and a holding portion,
    wherein the entrance portion is wider than the holding portion,
    wherein each of the plurality of carriers is configured to pivot upwards from the base position to the loading position, the slot-like portion being oriented upwards with an open end of the slot-like portion thereof at least in the loading position,
    wherein the slot-like portion is adjacent the positioning device at least in the loading position thereof, in the loading zone.

12. The system according to claim 1, further comprising a hold down device at the loading zone, positioned above the supporting surface of the first conveying device, and arranged for contacting an upper side of the carcass leg part while it is transported on the first conveying device.

13. A method for processing a carcass leg part comprising a holding section at or in the vicinity of a foot portion of the carcass leg part, using a system according to claim 1, the method comprising the subsequent steps of:
    a) placing the carcass part on the supporting surface of the first conveying device, and
    positioning, using the first positioning element of the positioning device, the holding section of the carcass part at a predetermined position with respect to the supporting surface,
    b) transporting the carcass part to the loading zone, and
    c) transferring the carcass part at the holding section thereof from the supporting surface to a carrier at the loading zone, in an automated manner, so that the holding section of the carcass part is thereby loaded into the carrier and the carcass part is further transported by the second conveying device.

14. The method according to claim 13, using a system wherein the loading station further comprises a foot guide provided upstream of the loading zone, against which foot guide a free end of a foot portion of the carcass part is to be urged, in an urging direction transverse to the transport direction, in use when the carcass part is supported on the supporting surface;
    wherein step a) comprises
    urging a free end of the foot portion of the carcass part in the urging direction transverse to the transport direction against the foot guide upstream of the loading zone.

15. The method according to claim 13, using a system wherein the second positioning element is movable, between an active position in which the second positioning element points upwards with a free end thereof with respect to the supporting surface and an inactive position in which the second positioning element has moved away, from the first positioning element, such that in use in the active position of the second positioning element the holding section of the carcass part is caught between the first and second positioning element;
    wherein during step a) the carcass part is placed with the holding section against or at least directly adjacent to the first positioning element, while the second positioning element is in the inactive position, and
    wherein at the latest during step b) the second positioning element is moved from its inactive to its active position such that the holding section of the carcass part is caught between the first and second positioning element at least in the loading zone.

16. The method according to claim 13, using a system wherein the positioning device is configured such that the second positioning element is in the inactive position or at least moved toward the inactive position during the passing of the carcass part over the weighing device,
    wherein the system is configured such that a conveying speed of the weighing device is higher than a conveying speed of the section of the first conveying device upstream of the weighing device,
    wherein during step b) the carcass part passes over the in-line weighing device while the second positioning element is in the inactive position or is at least moved toward the inactive position during the passing of the carcass part over the weighing device.

* * * * *